United States Patent
Karadzic

(10) Patent No.: US 11,546,558 B2
(45) Date of Patent: Jan. 3, 2023

(54) METHOD FOR DISPLAYING A VIDEO STREAM OF A SCENE

(71) Applicant: Axis AB, Lund (SE)

(72) Inventor: Vladimir Karadzic, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/082,100

(22) Filed: Oct. 28, 2020

(65) Prior Publication Data

US 2021/0144341 A1    May 13, 2021

(30) Foreign Application Priority Data

Nov. 7, 2019 (EP) ..................................... 19207600

(51) Int. Cl.
| | |
|---|---|
| *H04N 7/18* | (2006.01) |
| *H04N 5/235* | (2006.01) |
| *H04N 5/57* | (2006.01) |
| *H04N 7/025* | (2006.01) |

(Continued)

(52) U.S. Cl.
CPC ........... *H04N 7/183* (2013.01); *H04N 5/2354* (2013.01); *H04N 5/57* (2013.01); *H04N 7/0255* (2013.01); *H04N 7/08* (2013.01); *H04N 9/68* (2013.01)

(58) Field of Classification Search
CPC ........ H04N 7/183; H04N 5/2354; H04N 5/57; H04N 7/0255; H04N 7/08; H04N 9/68;

(Continued)

(56) References Cited

U.S. PATENT DOCUMENTS

| | | | | |
|---|---|---|---|---|
| 4,520,390 A | * | 5/1985 | Paredes ................... | F23N 5/082 505/445 |
| 5,398,057 A | * | 3/1995 | Tapp ................ | G08B 13/19645 348/154 |

(Continued)

FOREIGN PATENT DOCUMENTS

| | | |
|---|---|---|
| CN | 107734225 B | 6/2019 |
| JP | 2012128210 A * | 7/2012 |
| WO | 2015/199806 A1 | 12/2015 |

OTHER PUBLICATIONS

Extended European Search Report dated Jan. 8, 2020 for the European Patent Application No. 19207600.8.

*Primary Examiner* — Michael Lee
(74) *Attorney, Agent, or Firm* — Volpe Koenig

(57) ABSTRACT

A method for displaying a video stream of a scene captured by a monitoring camera on a display of a remote client device comprises receiving, at the client device, the video stream and information indicating an on/off status for an IR-illuminator illuminating the scene; setting a display setting of the display differently based on upon the on/off status for the IR-illuminator; and displaying the video stream on the display using the display setting. The client device comprises a display, a receiver which receives a video stream from the monitoring camera, and a control circuit. The control circuit executes an IR-illuminator status function to extract information indicating on/off status for the IR-illuminator illuminating the scene, a display setting function of the display differently upon the on/off status for the IR-illuminator, and a displaying function displays the video stream on the display using the setting set by the display setting function.

10 Claims, 4 Drawing Sheets

(51) Int. Cl.
*H04N 7/08* (2006.01)
*H04N 9/68* (2006.01)

(58) Field of Classification Search
CPC .... H04N 5/2256; H04N 21/4854; H04N 7/18;
G03B 15/02
USPC ........................................................ 348/143
See application file for complete search history.

(56) References Cited

U.S. PATENT DOCUMENTS

| | | | |
|---|---|---|---|
| 8,077,995 B1* | 12/2011 | Terre | H04N 5/33 |
| | | | 382/254 |
| 9,706,126 B2 | 7/2017 | Cho et al. | |
| 2003/0160153 A1* | 8/2003 | Hara | H04N 5/243 |
| | | | 250/214 VT |
| 2005/0072921 A1* | 4/2005 | Moisei | B60R 1/00 |
| | | | 250/330 |
| 2006/0203091 A1* | 9/2006 | Eggers | B60Q 1/14 |
| | | | 348/148 |
| 2010/0309315 A1* | 12/2010 | Hogasten | H04N 5/332 |
| | | | 348/164 |
| 2011/0164133 A1 | 7/2011 | Chang | |
| 2012/0133833 A1* | 5/2012 | Yoshida | H04N 21/4436 |
| | | | 348/563 |
| 2012/0321273 A1* | 12/2012 | Messmer | H04N 13/128 |
| | | | 386/224 |
| 2018/0045867 A1 | 2/2018 | Kunugise et al. | |
| 2018/0324367 A1 | 11/2018 | Siddiqui et al. | |
| 2019/0346977 A1* | 11/2019 | Chen | G06F 3/14 |
| 2020/0112662 A1* | 4/2020 | Sakamoto | H04N 9/04553 |
| 2021/0227121 A1* | 7/2021 | Totsch | H04N 5/2354 |

* cited by examiner

METHOD FOR DISPLAYING A VIDEO STREAM OF A SCENE

TECHNICAL FIELD

The present invention relates to method for displaying a video stream of a scene captured by a monitoring camera on a display of a client device. Also, a client device and a monitoring system comprising such a client device is presented.

BACKGROUND

When monitoring a scene using a monitoring camera, it is at times necessary to add light to the scene in order to enable capturing of images of sufficient quality. Illuminators may be integrated in the monitoring camera, or external to the monitoring camera. The illuminators may add visible light. However, since image sensors used in monitoring cameras are generally sensitive to infrared radiation, IR, or more specifically near infrared radiation, NIR, the illuminators may advantageously add IR instead of visible light. In this manner, a sufficient amount of light may be provided for image capture, while avoiding disturbing visible light. A decision regarding when to illuminate a scene with IR may be taken depending on the light conditions at the scene.

A video stream of the scene captured by the monitoring camera may be viewed at a client device remote from the monitoring camera. However, depending on the light conditions at the scene user experience may vary. For example, the possibility to view details of the video stream may vary depending on the light conditions at the scene. Hence, there is a need in being able to better display the video stream at the client device.

SUMMARY

Alleviating or eliminating one or more of the above-identified deficiencies in the art and disadvantages singly or in any combination and solving at least the above-mentioned problem would be beneficial.

According to a first aspect a method for displaying, on a display of a client device, a video stream of a scene captured by a monitoring camera is provided. The client device is remote from the monitoring camera. The method comprises receiving the video stream; receiving information indicating an on/off status for an IR-illuminator illuminating the scene captured by the monitoring camera; setting a display setting of the display differently based on upon the on/off status for the IR-illuminator is on or off; and displaying the video stream on the display using the set display setting.

By the present method, details of the video stream may be better displayed such that an operator may see the details better. This since the overall appearance of the display may be harmonized. The appearance of the display may be set based on appearance of the video steam from monitoring camera. For example, a generally dark video stream, a video stream captured using the IR-illuminator on may be display using a first set-up of the display and a generally light video stream, a video stream captured having the IR-illuminator off, hence illuminated by visible light, may be display using a second set-up of the display. There is no dependency to the time zone or the time where the client device is located compared with where the video stream was captured. Hence, playback of the video stream may be performed differently depending the environment at the monitoring camera capturing the video stream. Further possible benefits of the present method will be discussed under the section detailed description below.

The display setting may comprise a color setting for a background area of the display enclosing a video stream display area of the display.

Upon the on/off status for the IR-illuminator is on, the color setting for the background area may be set to be darker than upon the on/off status for the IR-illuminator is off.

The display setting may comprise a brightness setting of the display.

Upon the on/off status for the IR-illuminator is on, the brightness setting may be darker than upon the on/off status for the IR-illuminator is off.

The display setting may comprise a color temperature setting of the display.

Upon the on/off status for the IR-illuminator is on, the color temperature setting may be warmer than upon the on/off status for the IR-illuminator is off.

The method may further comprise extracting the on/off status for the IR-illuminator from metadata in the video stream.

The method may further comprise requesting, by the client device, the on/off status for the IR-illuminator.

The method may further comprise transmitting, from the IR-illuminator, the on/off status for the IR-illuminator. The transmitting of the on/off status for the IR-illuminator may be made upon a change of the on/off status.

According to a second aspect, a non-transitory computer readable recording medium is provided. The non-transitory computer readable recording medium has instructions, possibly in the form of computer readable program code, stored thereon which when executed on a device having processing capability is configured to perform the method of the first aspect.

The above-mentioned features of the method according to the first aspect, when applicable, apply to this second aspect as well. In order to avoid undue repetition, reference is made to the above.

According to a third aspect a client device is provided. The client device comprises a display, a receiver configured to receive a video stream of a scene captured by a monitoring camera remote from the client device, and a control circuit. The control circuit is configured to execute: an IR-illuminator status function configured to extract information indicating an on/off status for an IR-illuminator illuminating the scene captured by the monitoring camera, a display setting function configured to set a display setting of the display differently upon the on/off status for the IR-illuminator is on as compared upon the on/off status for the IR-illuminator is off, and a displaying function configured to display the video stream on the display using the display setting set by the display setting function.

The above-mentioned features of the method according to the first aspect, when applicable, apply to this third aspect as well. In order to avoid undue repetition, reference is made to the above.

According to a fourth aspect a monitoring system is provided. The monitoring system comprises a monitoring camera configured to capture a video stream of a scene, an IR-illuminator configured to, depending on light conditions at the scene, illuminate the scene captured by the monitoring camera with IR-light, and a client device according to the third aspect. The client device is remote from the monitoring camera and the IR-illuminator.

The monitoring camera may be configured to add metadata to the video stream, wherein the metadata comprises information indicating an on/off status for the IR-illuminator.

The above-mentioned features of the method according to the first aspect, when applicable, apply to this fourth aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present teachings will now be set forth more fully hereinafter with reference to the accompanying drawings, in which currently preferred embodiments are shown. This teachings may, however, be embodied in many different forms and should not be construed as limited to the embodiments set forth herein; rather, these embodiments are provided for thoroughness and completeness, and to fully convey the scope of the teachings to the skilled person.

Figure 1:
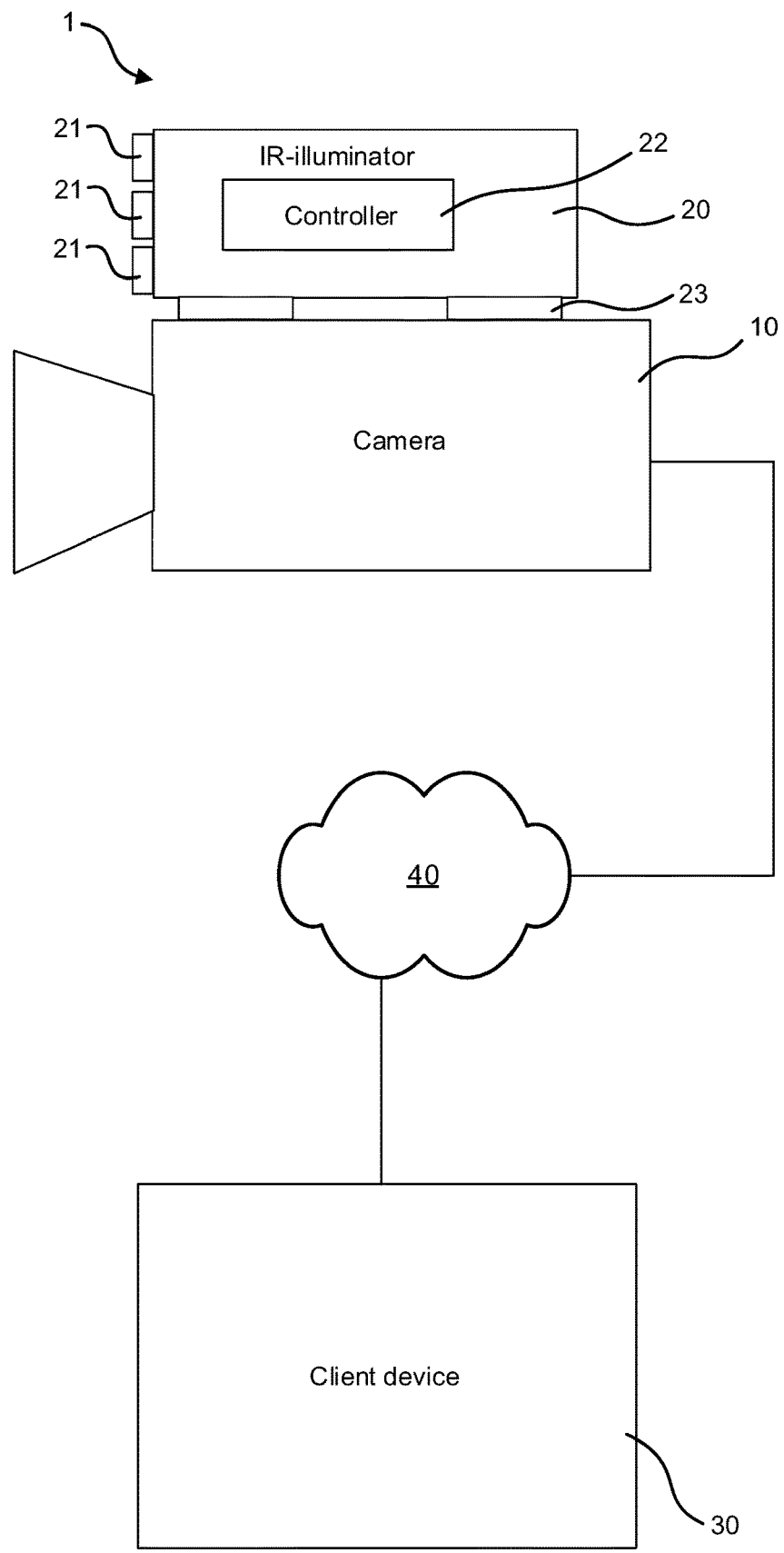
FIG. 1 illustrate a monitoring system comprising a monitoring camera, an IR-illuminator and a client device.

FIG. 1 illustrate a monitoring system 1. The monitoring system 1 comprises a monitoring camera 10, an IR-illuminator 20 and a client device 30.

The monitoring camera 10 is typically a digital video camera. The monitoring camera 10 is configured to monitor a scene. Typically, this is made by capturing a video stream of the scene.

The IR-illuminator 20 is configured to illuminate the scene monitored by the monitoring camera 10 with IR-light. The IR-illuminator 20 comprises one or more light sources 21. Each light source 21 is configured to emit IR-light. The IR-light emitted by the one or more light sources 21 forms a beam of illumination emitted by the IR-illuminator 20. The one or more light sources 21 may be LED-based light sources. Hence, the one or more light sources 21 of the illuminator may be IR-LEDs.

The IR-illuminator 20 may be controlled by a controller 22. The controller 22 is configured to control a power of illumination delivered by the IR-illuminator 20. The power of illumination delivered by the IR-illuminator 20 may depend on light conditions at the scene. For example, upon light conditions being at or below a preset threshold the IR-illuminator 20 may be configured to be on and upon light conditions being above the preset threshold the IR-illuminator 20 may be configured to be off. The controller 22 of the IR-illuminator 20 may be configured to transmit information indicating whether the IR-illuminator 20 is on or off. Hence, the IR-illuminator 20 may be configured to transmit information regarding an on/off status for the IR-illuminator 20. The information regarding an on/off status for the IR-illuminator 20 may be communicated to the client device 30. The information regarding the on/off status of the IR-illuminator 20 may be transmitted upon a change of the on/off status. The information regarding the on/off status of the IR-illuminator 20 may be transmitted upon a request from the client device 30. The information regarding the on/off status of the IR-illuminator 20 may be provided to the monitoring camera 10. The monitoring camera 10 may be configured to add metadata to the video stream, wherein the metadata comprises the information indicating an on/off status for the IR-illuminator 20. The metadata is temporally correlated with the video stream. Hence, the metadata indicated which image frames of the video stream that have been captured using the IR-illuminator 20 in an on-status and which image frames of the video stream that have been captured using the IR-illuminator 20 in an off-status.

The controller 22 may control other features of the IR-illuminator 20 as well. For example, the controller 22 may control a width of the beam of illumination emitted by the IR-illuminator 20. The controller 22 may control the beam of illumination emitted by the IR-illuminator 20 so that it adapts to a zoom setting of the monitoring camera 10. By this the entire field of view of the monitoring camera 10 may be evenly illuminated. According to another example, the controller 22 may individually control the one or more light sources 21 of the IR-illuminator 20.

The monitoring camera 10 and the IR-illuminator 20 may be in the form of separate devices. The IR-illuminator 20 may, just as in the example of FIG. 1, be mounted to the monitoring camera 10 using an illuminator mount 23. Alternatively, the IR-illuminator 20 may be arranged at a distance from the monitoring camera 10. Yet alternatively, the IR-illuminator 20 may form an integral part of the monitoring camera 10. All these different possible set-ups of the monitoring camera 10 and the IR-illuminator 20 have in common that the IR-illuminator 20 is configured to illuminate the scene monitored by the monitoring camera 10.

The client device 30 is located remote from the monitoring camera 10 and the IR-illuminator 20. By remote is in this context meant that the client device 30 is located at a different site than the monitoring camera 10 and the IR-illuminator 20. For example, the client device 30 may be located at a different building, and/or a different city or part of a city than the monitoring camera 10 and the IR-illuminator 20. The client device 30 is configured to send and/or receive data to and/or from to the monitoring camera 10 and/or the IR-illuminator 20. The data is communicated via a communication network 40. The communication network 40 may be wired and/or wireless using any type of network connection standard, for example mobile internet communication standards (3G, 4G, 5G or the like) and/or WiFi. For example, the client device 30 is configured to receive a video steam of the scene monitored by the monitoring camera 10 over the communication network 40. Hence, the monitoring camera 10 is configured to send a captured video stream to the client device 30. Further, the client device 30 may be configured to receive information regarding an on/off status for the IR-illuminator 20 from the IR-illuminator 20. Alternatively, or in combination, the client device 30 may be configured to receive information regarding an on/off status for the IR-illuminator 20 from the monitoring camera 10 or from a control device configured to control the IR-illuminator 20 and/or the monitoring camera 10. Many other kinds of data may as well be communicated between the client device 30 and the monitoring camera 10 and/or the IR-illuminator 20.

Figure 2:
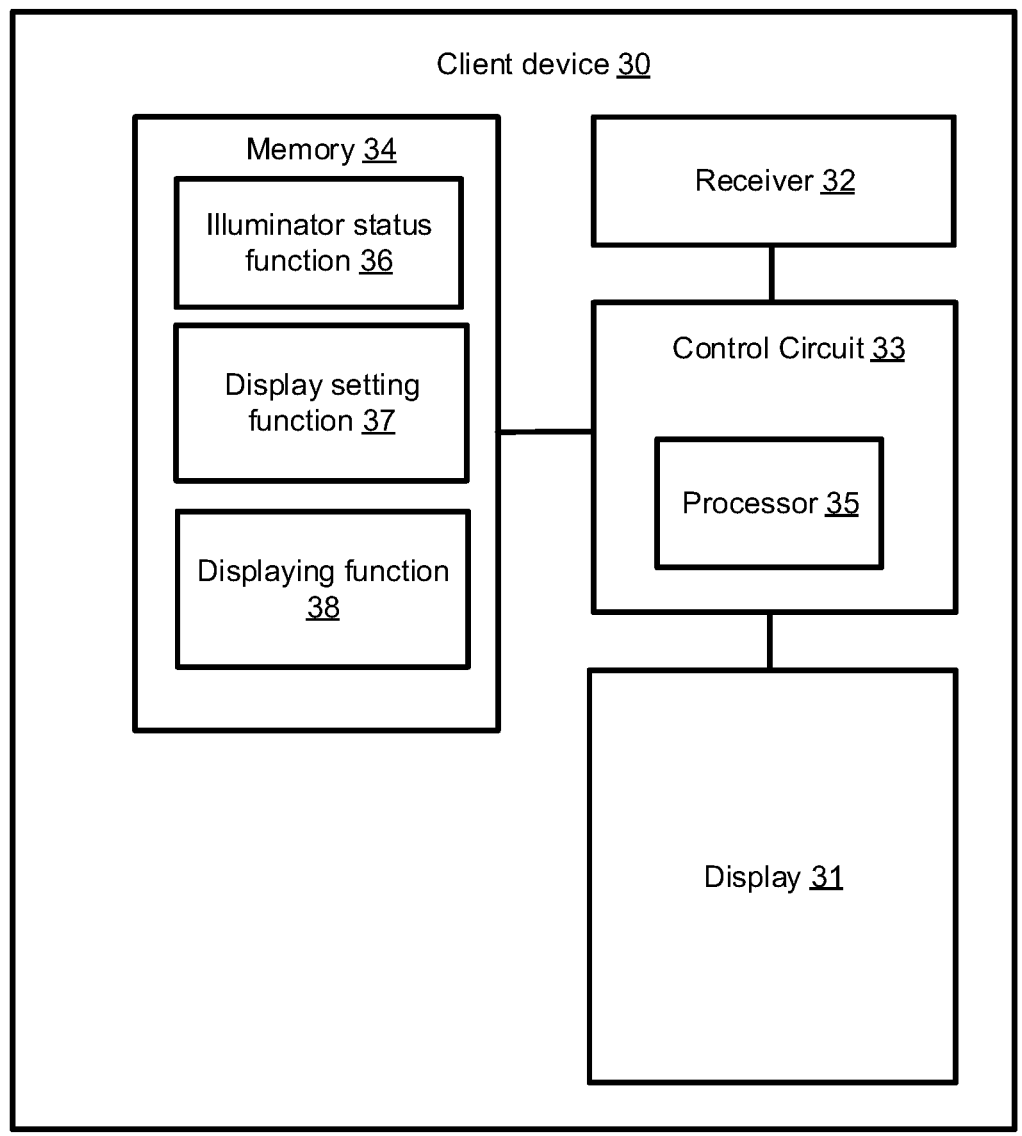
FIG. 2 is a schematic block diagram of the client device of FIG. 1.

With reference to FIG. 2 the client device 30 will be discussed in more detail. The client device 30 may be any kind of device configured to receive and display the video stream captured by the monitoring camera 10. According to non-limiting examples the client device 30 may be a laptop a stationary computer, a mobile phone, or a tablet. The client device 30 comprises a display 31, a receiver 32, a control circuit 33, and a memory 34.

The receiver 32 is configured to receive data sent over the communication network 40. For example, the receiver 32 is configured to, from the monitoring camera 10, receive a video stream of a scene captured by the monitoring camera 10. The receiver 32 may further be configured to receive information regarding the on/off status for the IR-illuminator 20 configured to illuminate the scene captured by the monitoring camera 10.

The control circuit 33 is configured to carry out overall control of functions and operations of the client device 30. The control circuit 33 may include a processor 35, such as a central processing unit (CPU), microcontroller, or microprocessor. The processor 35 is configured to execute program code stored in the memory 34, in order to carry out functions and operations of the client device 30.

The memory 34 may be one or more of a buffers, a flash memory, a hard drive, a removable medium, a volatile memory, a non-volatile memory, a random access memory (RAM), or another suitable device. In a typical arrangement, the memory 34 may include a non-volatile memory for long term data storage and a volatile memory that functions as system memory for the control circuit 33. The memory 34 may exchange data with the control circuit 33 over a data bus. Accompanying control lines and an address bus between the memory 34 and the control circuit 33 also may be present.

Functions and operations of the client device 30 may be embodied in the form of executable logic routines (e.g., lines of code, software programs, etc.) that are stored on a non-transitory computer readable medium (e.g., the memory 34) of the client device 30 and are executed by the control circuit 33 (e.g., using the processor 35). Furthermore, the functions and operations of the client device 30 may be a stand-alone software application or form a part of a software application that carries out additional tasks related to the client device 30. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 33 is configured to execute an illuminator status function 36. The illuminator status function 36 is configured to extract information indicating an on/off status for the IR-illuminator 20. The illuminator status function 36 may be configured to extract information indicating the on/off status for the IR-illuminator 20 from metadata in the video stream of the scene. This in case the monitoring camera 10 is configured to include such metadata in the video stream. Alternatively, or in combination, the illuminator status function 36 may be configured to extract information indicating the on/off status for the IR-illuminator 20 by actively requesting the information from the IR-illuminator 20, from the monitoring camera 10 and/or from the control device controlling the IR-illuminator 20 and/or the monitoring camera 10. Hence, the illuminator status function 36 may be configured according to a pull notifying set-up wherein the information indicating the on/off status for the IR-illuminator 20 is pulled by the client device 10 from the IR-illuminator 20, from the monitoring camera 10 and/or from the control device controlling the IR-illuminator 20 and/or the monitoring camera 10. Alternatively, or in combination, the illuminator status function 36 may be configured to extract information indicating the on/off status for the IR-illuminator 20 by passively receiving the information from the IR-illuminator 20, from the monitoring camera 10 and/or from the control device controlling the IR-illuminator 20 and/or the monitoring camera 10. Hence, the illuminator status function 36 may be configured according to a push notifying set-up wherein the information indicating the on/off status for the IR-illuminator 20 is pushed from the IR-illuminator 20, from the monitoring camera 10 and/or from the control device controlling the illuminator 20 and/or the monitoring camera 10 to the client device 30.

The control circuit 33 is further configured to execute a display setting function 37. The display setting function 37 is configured to set a display setting of the display 31. The display setting function 37 is configured to set the display setting of the display 31 based on the information indicating the on/off status for the IR-illuminator 20. Especially, the display setting function 37 is configured to set the display setting of the display 31 differently upon the on/off status for the IR-illuminator 20 is on as compared to upon the on/off status for the IR-illuminator 20 is off.

Figure 3:
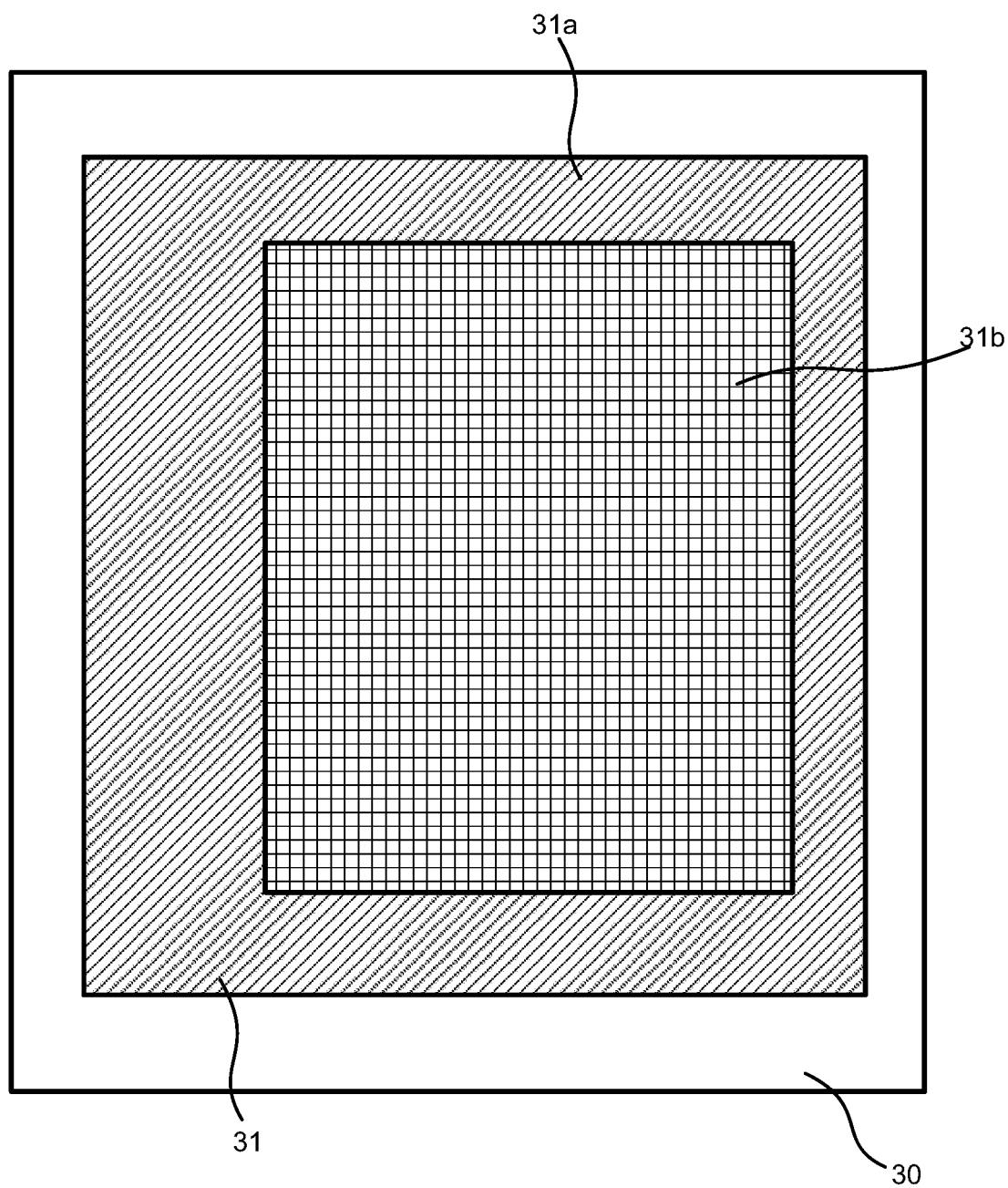
FIG. 3 schematically illustrate a display of the client device divided into a background area and a video stream display area.

As schematically illustrated in FIG. 3, the display setting may comprise a color setting for a background area 31a of the display 31 enclosing a video stream display area 31b of the display 31. Upon the on/off status for the IR-illuminator 20 is on the color setting for the background area 31a may be darker than upon the on/off status for the IR-illuminator 20 is off. Hence, upon the on/off status for the IR-illuminator 20 is on a relatively dark color setting (i.e. dark colors such as black is dominant) is used for the background area 31a and upon the on/off status for the IR-illuminator 20 is off a relatively light color setting (i.e. light colors such as white is dominant) is used for the background area 31a. The background area 31a may fully or partly enclose the video stream display area 31b. In the in FIG. 3 illustrated example the background area 31a fully encloses the video stream display area 31b. By setting the color setting of the background area to be relatively dark upon the on/off status for the IR-illuminator 20 is on the whole appearance of the display 31 will be towards dark colors. This since a video stream captured using IR-illumination typically is dark. By having the whole appearance of the display 31 being towards dark colors, i.e. dominant black colors, the appearance of the display will be adopted so that to the eyes of an operator may more easily view the display. Further, details of objects in the video stream may be better distinguishable in such an appearance of the display. The vice versa will be true for the display upon the on/off status for the IR-illuminator 20 is on, in such case the whole appearance of the display 31 will be towards light colors. This since a video stream captured not using IR-illumination typically is light (illuminated by natural day light or with artificial visible light). Having the whole appearance of the display being towards light colors, i.e. dominant light colors, the appearance of the display will be adopted so that to the eyes of an operator may more easily view the display. Further, details of objects in the video stream may be better distinguishable in such an appearance of the display. Moreover, by using different color settings depending upon the IR-illuminator 20 is on or off may save power (and possibly also battery life time) at the client device.

Alternatively, or in combination, the display setting may comprise a brightness setting for the display 31. Upon the on/off status for the IR-illuminator 20 is on the brightness setting may be darker than upon the on/off status for the IR-illuminator 20 is off. The same effects and possible benefits discussed above in connection with the color setting of the background area 31a apply to setting the brightness of the display differently based on if the on/off status for the IR-illuminator 20 is on or off. Hence, an overall relatively darker appearance of the display may be beneficial upon the IR-illuminator 20 was on while capturing the displayed video stream and an overall relatively brighter appearance of the display may be beneficial upon the IR-illuminator 20 was off while capturing the displayed video stream.

Alternatively, or in combination, the display setting may comprise color temperature setting of the display 31. Upon the on/off status for the IR-illuminator 20 is on the color temperature setting may be set to be warmer than upon the on/off status for the IR-illuminator 20 is off. The same effects and possible benefits discussed above in connection with the color setting of the background area 31a apply to setting the color temperature of the display differently based on if the on/off status for the IR-illuminator 20 is on or off. Hence, an overall relatively warmer color temperature appearance of the display may be beneficial upon the IR-illuminator 20 was on while capturing the displayed video stream and an overall relatively colder color temperature of the display may be beneficial upon the IR-illuminator 20 was off while capturing the displayed video stream.

The control circuit 33 is further configured to execute a displaying function 38. The displaying function 38 is configured to display the video stream on the display 31 using the display setting set by the display setting function 37.

Figure 4:
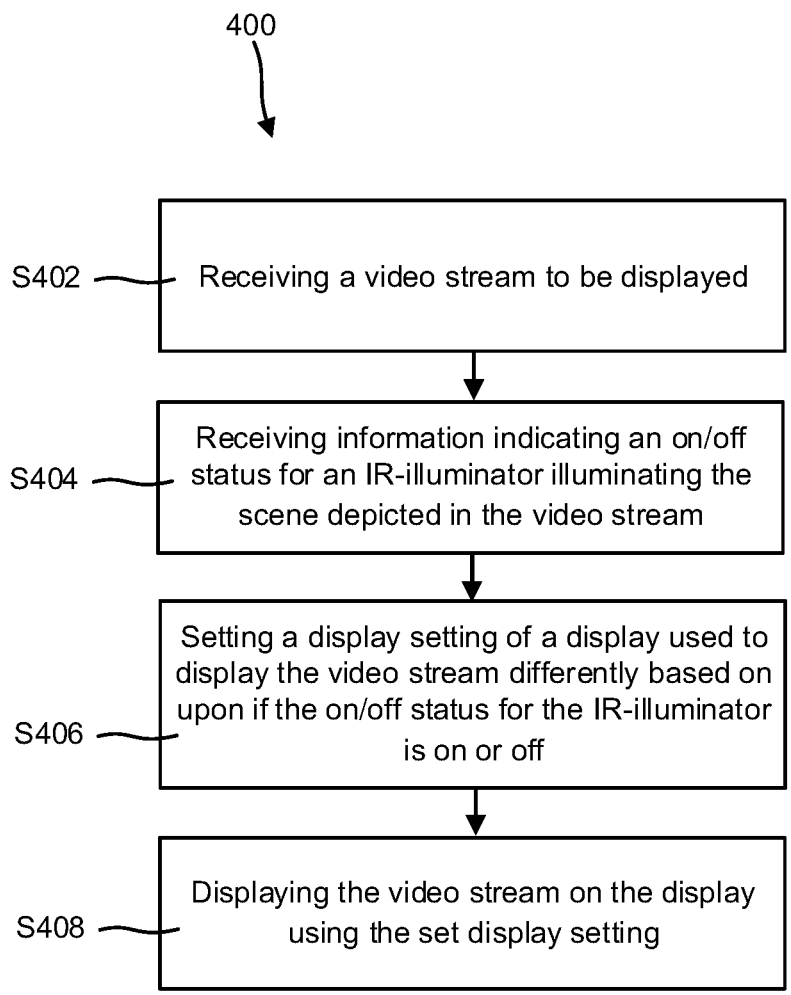
FIG. 4 is a block scheme of a method for displaying a video stream of a scene captured by the monitoring camera on the display of the client device.

In connection with FIG. 4 a method 400 for displaying, on the display 31 of the client device 30, a video stream of a scene captured by the monitoring camera 10 will be discussed. The method 400 is based on the insight made by the inventor that by setting a display setting of a display of the client device differently based on upon if the IR-illuminator 20 was on or off while the monitoring camera 10 was capturing the video stream being displayed on the display 31, the overall appearance of the display 31 may be set so that to the eyes of an operator may more easily view the display. Further, the present method may save on power consumption and hence possible also on battery life time at the client device.

Some of all the steps of the method 400 may be performed by the functions of the client device 30 described above. However, it is equally realized that some or all of the steps of the method 400 may be performed by similar functions performed at other devices. The method comprises the flowing steps. The steps may be performed in any suitable order.

Receiving S402, at the client device 30, the video stream to be displayed. The video stream being captured at the monitoring camera 10. The video stream may be sent directly from the monitoring camera 10 to the client device 30. Alternatively, the video stream may be received from a video management server (VMS) configured to manage video streams from the monitoring camera 10 and possible a plurality of other monitoring cameras.

Receiving S404, at the client device 30, information indicating an on/off status for the IR-illuminator 20 illuminating the scene captured by the monitoring camera 10. The step of receiving S404 the information indicating the on/off status for the IR-illuminator 20 may comprise extracting the on/off status for the IR-illuminator 20 from metadata in the video stream. Accordingly, the method 400 may further comprise adding the information indicating the on/off status for the IR-illuminator 20 as metadata to the video stream. This was discussed above and in in order to avoid undue repletion it will not be further discussed in connection with this step of the method 400. Alternatively, or in combination, the step of receiving S404 the information indicating the on/off status for the IR-illuminator 20 may comprise requesting, by the client device 30, the on/off status for the IR-illuminator 20. Ways of requesting this information using pull notification was discussed above, and in in order to avoid undue repletion it will not be further discussed in connection with this step of the method 400. Alternatively, or in combination, the step of receiving S404 the information indicating the on/off status for the IR-illuminator 20 may comprise transmitting, from the IR-illuminator 20, the on/off status for the IR-illuminator 20. Ways of receiving this information using push notification was discussed above, and in in order to avoid undue repletion it will not be further discussed in connection with this step of the method 400.

Setting S406 a display setting of the display 31 differently based on upon if the on/off status for the IR-illuminator is on or off. The display setting may comprise a color setting for the background area 31a of the display 31 enclosing a video stream display area 31b of the display 31. Upon the on/off status for the IR-illuminator 20 is on, the color setting for the background area 31a may be darker than upon the on/off status for the IR-illuminator 20 is off. Alternatively, or in combination, the display setting may comprise a brightness setting of the display 31. Upon the on/off status for the IR-illuminator 20 is on, the brightness setting may be darker than upon the on/off status for the IR-illuminator is off. Alternatively, or in combination, the display setting may comprise a color temperature setting of the display 31. Upon the on/off status for the IR-illuminator 20 is on, the color temperature setting may be warmer than upon the on/off status for the IR-illuminator is off.

Displaying S408 the video stream on the display 31 using the set display setting.

The person skilled in the art realizes that the present teachings are by no means is limited to the preferred embodiments described above. On the contrary, many modifications and variations are possible within the scope of the appended claims.

For example, the client device 30 may be configured to run an application configured to perform the method 400 discussed above.

Additionally, variations to the disclosed embodiments can be understood and effected by the skilled person in practicing the teachings, from a study of the drawings, the disclosure, and the appended claims.

The invention claimed is:

1. A method for displaying a video stream of a scene captured by a monitoring camera on a display of a client device remote from the monitoring camera, the method comprising:
   receiving the video stream captured by the monitoring camera;
   actively requesting on/off status information for an IR-illuminator illuminating the scene captured by the monitoring camera;
   receiving information indicating the on/off status for the IR-illuminator illuminating the scene captured by the monitoring camera;
   setting a display setting of the display to a first display setting when the status of the IR-illuminator is on and to a second display setting when the status of the IR-illuminator is off; and
   displaying the video stream on the display using the set display setting,
   wherein the display comprises a video stream display area in which the video stream is displayed and a background area enclosing the video stream display area, and
   wherein the setting of the display setting based on the on/off status indicated by the information comprises setting a color setting for the background area and setting at least one of a brightness setting or a color temperature setting for the display based on the on/off status indicated by the information.

2. The method according to claim 1, wherein upon the on/off status for the IR-illuminator is on, the color setting for the background area is darker than upon the on/off status for the IR-illuminator is off.

3. The method according to claim 1, wherein upon the on/off status for the IR-illuminator is on, the brightness setting is darker than upon the on/off status for the IR-illuminator is off.

4. The method according to claim 1 wherein upon the on/off status for the IR-illuminator is on, the color temperature setting is warmer than upon the on/off status for the IR-illuminator is off.

5. The method according to claim 1, further comprising:
   requesting, by the client device, the on/off status for the IR-illuminator.

6. The method according to claim 1, further comprising:
   transmitting, from the IR-illuminator, the on/off status for the IR-illuminator upon a change of the on/off status.

7. A non-transitory computer-readable storage medium having stored thereon instructions for implementing the video encoding method according to claim 1, when executed on a device having processing capabilities.

8. A client device comprising:
   a display;
   a receiver configured to receive a video stream of a scene captured by a monitoring camera remote from the client device; and
   a control circuit configured to execute:
      an IR-illuminator status function configured to:
      actively request on/off status information for an IR-illuminator illuminating the scene captured by the monitoring camera;
      a display setting function configured to set a display setting of the display to a first display setting when the status of the IR-illuminator is on and to a second display setting when the status of the IR-illuminator is off, and
      a displaying function configured to display the video stream on the display using the display setting set by the display setting function,
   wherein the display comprises a video stream display area in which the video stream is displayed and a background area enclosing the video stream display area, and
   wherein the setting of the display setting based on the on/off status indicated by the information comprises setting a color setting for the background area and setting at least one of a brightness setting or a color temperature setting for the display based on the on/off status indicated by the information.

9. A monitoring system, comprising:
   a monitoring camera configured to capture a video stream of a scene;
   an IR-illuminator configured to, depending on light conditions at the scene, illuminate the scene captured by the monitoring camera with IR-light; and
   a client device comprising:
      a display;
      a receiver configured to receive a video stream of a scene captured by a monitoring camera remote from the client device; and
      a control circuit configured to execute:
         an IR-illuminator status function configured to:
         actively request on/off status information for the IR-illuminator illuminating the scene captured by the monitoring camera;
         a display setting function configured to set a display setting of the display to a first display setting when the status of the IR-illuminator is on and to a second display setting when the status of the IR-illuminator is off, and
         a displaying function configured to display the video stream on the display using the display setting set by the display setting function,
   wherein the display comprises a video stream display area in which the video stream is displayed and a background area enclosing the video stream display area, and
   wherein the setting of the display setting based on the on/off status indicated by the information comprises setting a color setting for the background area and setting at least one of a brightness setting or a color temperature setting for the display based on the on/off status indicated by the information.

10. The system according to claim 9, wherein the monitoring camera is configured to add metadata to the video stream, wherein the metadata comprises the information indicating an on/off status for the IR-illuminator.

* * * * *